United States Patent
Addison et al.

Patent Number: 5,156,887
Date of Patent: Oct. 20, 1992

[54] METHOD FOR INJECTING A CHEMICAL BARRIER INTO A SURFACE APERTURE

[75] Inventors: Mark K. Addison; William F. Campbell, both of Fort Worth; Ralph J. Panno, Grapevine, all of Tex.

[73] Assignee: General Dynamics Corporation, Fort Worth, Tex.

[21] Appl. No.: 657,661

[22] Filed: Feb. 19, 1991

Related U.S. Application Data

[62] Division of Ser. No. 427,607, Oct. 26, 1989, Pat. No. 5,073,224.

[51] Int. Cl.⁵ .............................................. B32B 35/00
[52] U.S. Cl. .................................. 427/140; 156/382; 156/94; 427/294; 427/350; 427/142; 427/295; 264/36
[58] Field of Search ............... 427/140, 238, 294, 295, 427/350, 142; 264/328.1, 328.13, 36; 156/94, 382

[56] References Cited

U.S. PATENT DOCUMENTS

| | | | |
|---|---|---|---|
| 1,953,452 | 4/1934 | Wertz | 72/106 |
| 2,847,318 | 8/1958 | Dowlen et al. | 427/140 |
| 3,765,975 | 10/1973 | Hollingsworth | 156/94 |
| 4,032,272 | 6/1977 | Miller | 425/12 |
| 4,144,625 | 3/1979 | Hogenhout | 29/34 |
| 4,280,861 | 7/1981 | Schwartz | 156/382 |
| 4,419,305 | 12/1983 | Matles | 156/382 |
| 4,429,658 | 2/1984 | Jones | 118/711 |
| 4,569,808 | 2/1986 | Smali | 264/36 |
| 4,582,551 | 4/1986 | Parkes et al. | 156/94 |
| 4,627,952 | 12/1986 | Ophir | 264/328 |
| 4,635,827 | 1/1987 | Roedig | 222/160 |
| 4,775,305 | 10/1988 | Alexander et al. | 425/12 |
| 4,776,780 | 10/1988 | Banks | 156/94 |
| 4,820,148 | 4/1989 | Anderson | 156/382 |
| 4,865,879 | 9/1989 | Finlay | 427/140 |
| 4,919,603 | 4/1990 | Herold et al. | 156/94 |
| 4,973,239 | 11/1990 | Herrmann et al. | 264/328.1 |
| 5,073,224 | 12/1991 | Addison et al. | 156/94 |

*Primary Examiner*—Michael Lusignan
*Assistant Examiner*—Diana L. Dudash
*Attorney, Agent, or Firm*—Arthur F. Zobal; Geoffrey A. Mantooth

[57] ABSTRACT

A method for injecting a chemical barrier into a surface aperture is provided. The method provides a vacuum to a work site to evacuate the air from the work site. Then, an injector head is located and retained at the work site. The injector head has a gasket that forms a seal around the work site. Pressurized fluid is conveyed to the work site through a first conduit in the injector head. Any unused fluid is conveyed away from the work site by a second conduit in the injector head.

28 Claims, 9 Drawing Sheets

METHOD FOR INJECTING A CHEMICAL BARRIER INTO A SURFACE APERTURE

This application is a division of application Ser. No. 07/427,607, filed Oct. 26, 1989, now U.S. Pat. No. 5,073,224.

FIELD OF INVENTION

This invention relates to forming a chemical barrier between parts of an assembled structure and their adjoining fasteners by injecting an appropriate substance around the installed fasteners. More particularly, this application and invention relates to injection of corrosion inhibitors, leak prevention materials and the like for repair or corrosion prevention.

DESCRIPTION OF THE PRIOR ART

Art in this area is generally difficult to find. The closest prior art of which the inventors are aware is an apparatus illustrated in FIG. 1 and described later hereinafter. A pre-examination search turned up the following patents:

4,635,827 describes an applicator for applying a sealant about a rivet machine also in which the machine applies sealant between the drilling hole and the setting rivet.

4,582,551 describes an invention rating to sealing of joints, leaks and pipelines and mains by an expandable tubular pig which is moved endwise through the pipeline. The sealant is in the form of anaerobically curable monomer which cures in the relatively air free conditions in the joint or leak in the pipeline. The pig forms within the pipeline an air free space which communicates with the joint or leak and which is isolated from the fluid in the main flow. The pig is hollow to permit the flow of fluid therethrough while the joint or leak is sealed. The sealant is injected into the leakage by way of space so that the sealant cures in situ to stop the leak.

4,429,658 describes an applicator for applying a sealant about rivets or the like.

4,144,625 describes an applicator apparatus for automatic riveting machines and the like in which a sealant is applied about the rivets.

1,953,452 describes process for repairing masonry structures in which a sealant material is injected into cracks or crevices in the masonry.

As can be seen the invention is not anticipated or made obvious by the prior art.

As can be seen it is desirable that the apparatus provide one or more of the following features delineated useful and not heretofore provided.

1. Injector should be useful in any type of location where either vacuum or mechanical hold device can hold it.
2. The injector must be able to use a pulse type injector system.
3. The injection system should be portable and highly automated such that it requires little time to set up and inject at a given location.
4. The effectiveness of the system should not depend upon the operator's strength or patience.

SUMMARY OF THE INVENTION

Accordingly it is an object of this invention to provide one of the foregoing features delineated as desirable and not heretofore provided.

It is an object of this invention to provide substantially all of the features delineated as desirable hereinbefore and not heretofore provided.

These and other objects will become apparent from the descriptive matter hereinafter, particularly when taken in conjunction with the appended drawings.

In accordance with one embodiment of this invention, there is provided a barrier injection apparatus for injecting a barrier at a site, being characterized by adjustable and releasable holding means for holding the injection apparatus against the force of injection; an injection apparatus, per se, for injecting a medium to form a barrier when in place; a storage tank for holding the medium at atmospheric pressure; pressure inducing pump or means connected with the storage tank for inducing pressure on the medium; conduit means connectedly extending from the storage tank and including the pump for conveying pressurized medium, to the injection site; a second conduit means connected with atmospheric pressure and adapted to remove unused medium from the injection site; adjusting means for moving the injector the correct distance from the injection site; and gasket sealingly surrounding the injection site for constraining the medium to flow into the injection site and insulating the medium from the holder. Also disclosed are preferred embodiments employing vacuum holders, pulse and static pressures, vessels for catching the medium drain from the injection site and the preferred form of the gasket.

In this way the injector can be employed readily even on aircraft or the like for injecting a barrier.

BRIEF DESCRIPTION OF THE DRAWINGS

FIG. 4 is a schematic view of a hydraulic circuit for a pulse type injector system such as illustrated in FIG. 2a.

DESCRIPTION OF PREFERRED EMBODIMENT(S):

It is to be borne in mind that this invention may be useful in a wide variety of types of barrier injection situations. It has been found, however, that this is particularly useful injecting a corrosion inhibitor around a fitting such as rivet or the like in an aircraft or Naval application. It is in the application of aircrafts that this embodiment of the invention will be described hereinafter.

Figure 1:
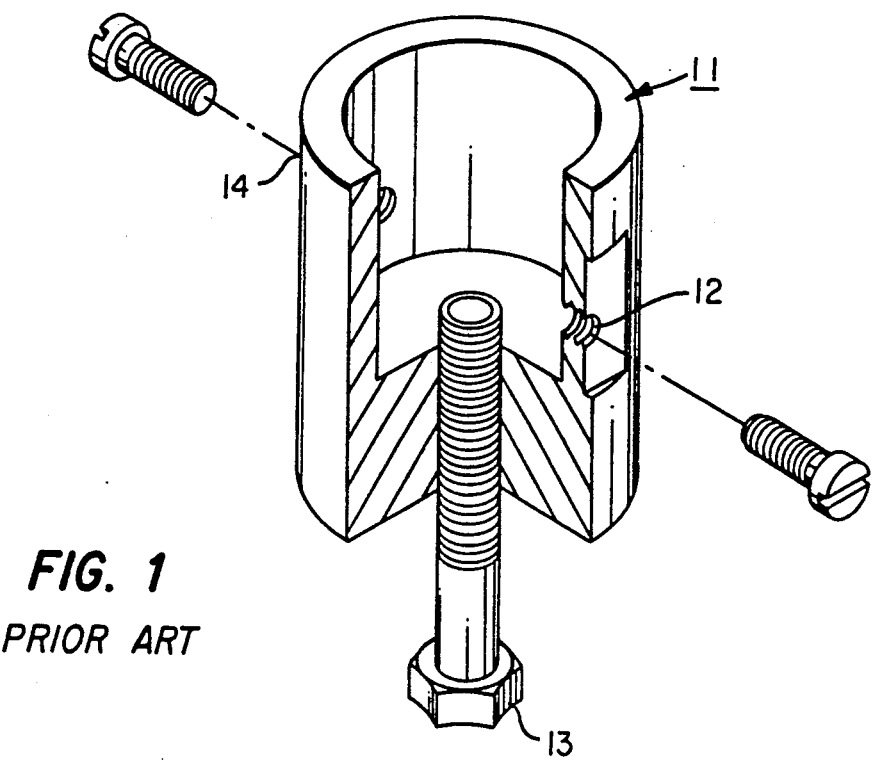
FIG. 1 is an isometric view, partly in section, illustrating a fuel leak repair injection device of the prior art.

The nearest approach to employing a method of this invention is a device used by General Dynamics to repair fuel leaks on the F-111 aircraft. FIG. 1 is an isometric view of this apparatus and is labeled prior art. The device was secured to the surface of the aircraft over a leaking fastener using an adhesive bond applied to the bonding surface 11 This surface was then bonded to the wing surface of the aircraft or the like. Thereafter the device had a fuel sealant injected through injection port 12. A large bolt 13 was turned to apply pressure to the sealant forcing the sealant around the fastener over which the apparatus was adhered. The bleed port 14 is used to release trapped air from the device.

This device required extensive cleaning of the surface both before and after bonding and a significant amount of time to cure the adhesive. The amount of sealant injected into the hole around the fastener was directly proportional to the amount of pressure applied to the bolt 13. Therefore this device was limited by the mechanical force the user was able to apply physically as well as to the patience of the user. The advantages of the injector of this invention can be seen by the following.

The injector of this invention uses a system of pumps and valves to pressurize and deliver the injection medium to the desired location. Two types of injection systems have been developed and employed; the pulse type and the static pressure type. A pulse type injector system is held in place using a vacuum cup or mechanical type hold-down system. The static type injector is held by a mechanical system for pressures above the hold-down capacity of the vacuum system. The injection system is portable and highly automated, requiring little time to set up and inject a given location. The effectiveness of the system is not dependent on the operator's strength or patience. Specifically, this invention enables providing a retrofit method of forming a chemical barrier between a structure and its adjoining fasteners that does not require disassembly of the structure and is suitable for a large number of affected areas. The intent of injecting this barrier is to prevent corrosion of a structure and its fasteners and/or prevent a fuel leak from developing around the fasteners.

Figure 2A:
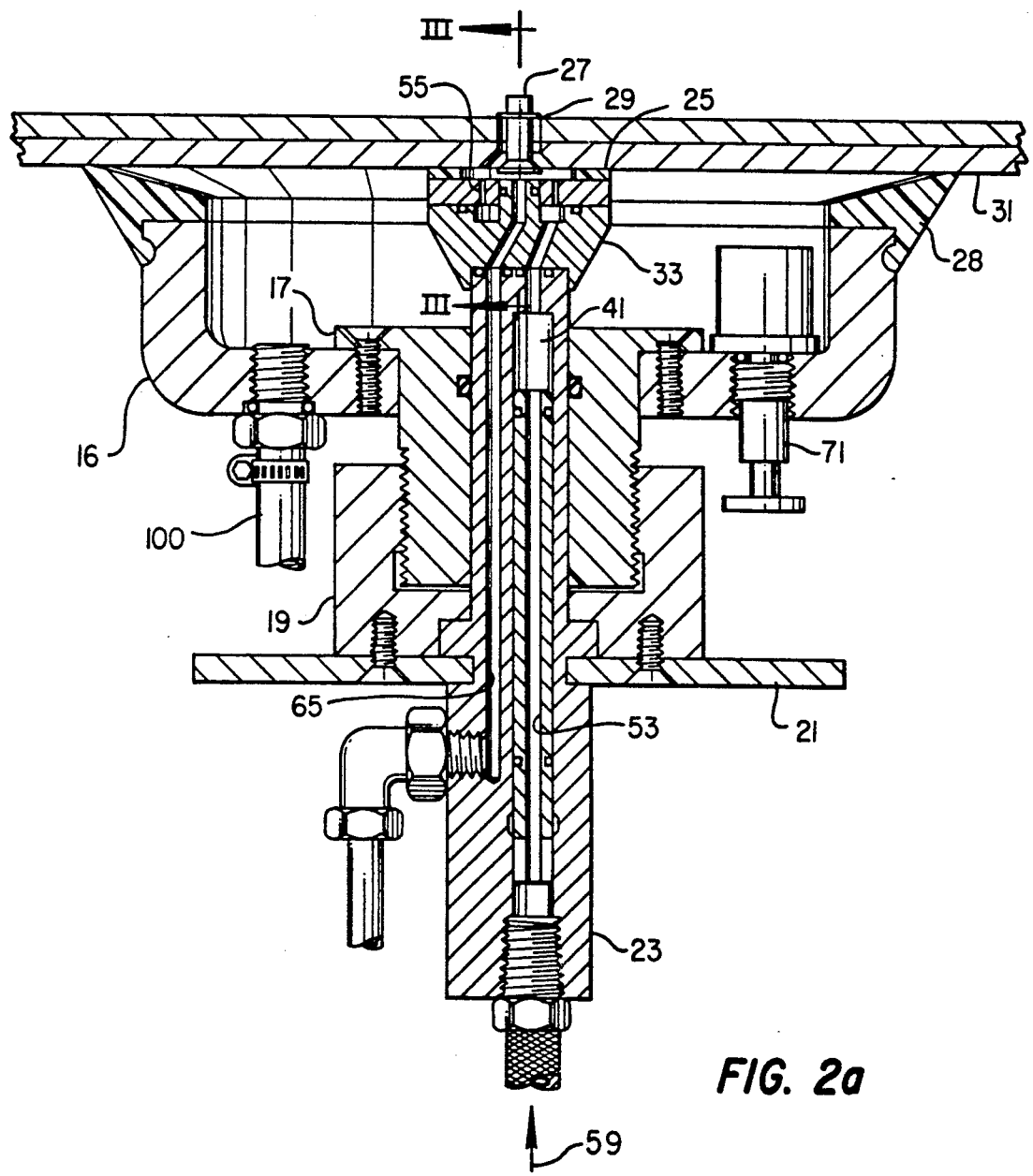
FIG. 2a is a cross-sectional view of a pulse type injector system with a vacuum cup hold down.

FIG. 2a shows a cross-sectional view of a pulse type injector system as it would be used to inject a typical corroded counter sunk fastener in the lower wing skin of an airplane. A circular vacuum cup 16 is fastened to a threaded sleeve 17. An adjusting collar 19 with a bar type adjusting handle 21 threads onto the sleeve 17. The adjusting collar and handle, 19, 21, turn independently of an injector body 23. Consequently, when the adjusting handle 21 is turned, the collar and handle 19, 21 bear on the injector body 23 moving the injector up or down without rotating it. The injector body 23 must not rotate in order to prevent an injector fitting gasket 25 from twisting and disturbing the seal. The injector fitting gasket extends about the injection site to force the medium that is injected about the fitting, such as the rivet, and into the fitting hole at the injection site.

Figure 3:
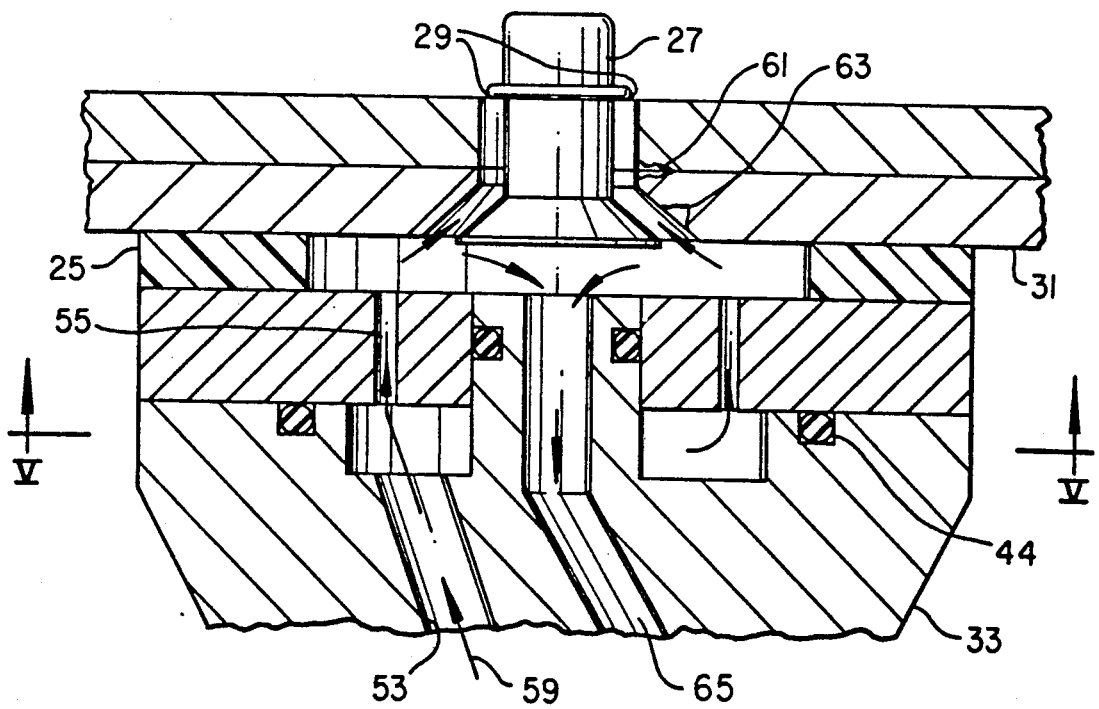
FIG. 3 is an enlarged partial cross-sectional view of the injector fitting of FIG. 2a along the dashed lines III—III.

FIG. 3 shows an enlarged detail of an injector fitting 33 located around one end of rivet 27, with the gasket 25 being a circular gasket that is disposed thereabout so as to sealingly fit and force the medium into the gap 29, shown somewhat enlarged Referring to FIGS. 2a, 2b, 3 and 5, the injector fitting 33 is coupled to one end of the injector body 23. The injector fitting 33 has an injection passage 53 and a drain passage 65. The injection passage 53 extends through the injector fitting 33 and through the injector body 23. At the gasket end of the fitting 33, the injection passage communicates with an annular channel. The fitting 33 has a central cylindrical portion that projects outwardly. The drain passage 65 extends through the cylindrical portion, through the remainder of the fitting 33 and through the injector body 23. A disk member 81a is coupled to the fitting 33 with fasteners 108. The disk member 81a has a central circular opening for receiving the cylindrical portion and the associated drain passage 65. The disk member 81a has plural injector orifices 55 therethrough. The orifices 55 surround the drain passage 65 and communicate with the injection passage 53. O-rings 44 and 110 are provided. The injector fitting gasket 25 is very important to the operation of the injection system. For example, it keeps the injection medium over the fastener, or rivet 27, and prevents the medium from flowing into the vacuum cup. The medium may be, for example, a corrosion inhibitor as will be discussed in more detail hereinafter. The gasket 25 is made from a polysulfide (a tough elastomer); or a tough synthetic rubber such as those rubber products sold under the trademarks Neoprene or Viton, all of which are very durable when in contact with most of the investigated injected media.

The surfaces of the fastener 27 and/or parts to be injected are first cleaned of paint, primer and surface corrosion. The injector fitting 33, is centered over the fastener 27 but away from the surface approximately 0.25 inch with the vacuum cup gasket 25 in firm contact with the surface 31.

Figure 4:
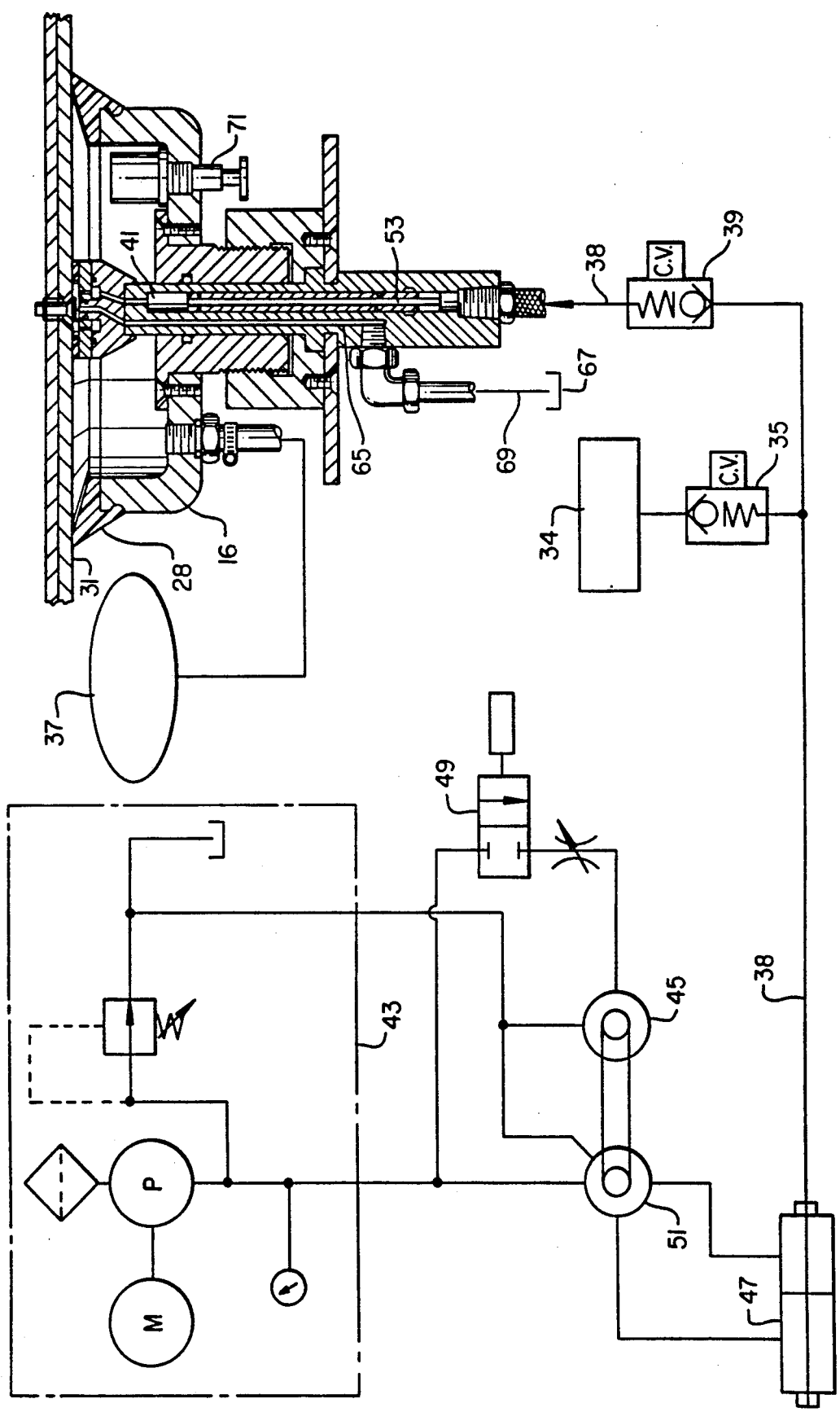
Figure 5:
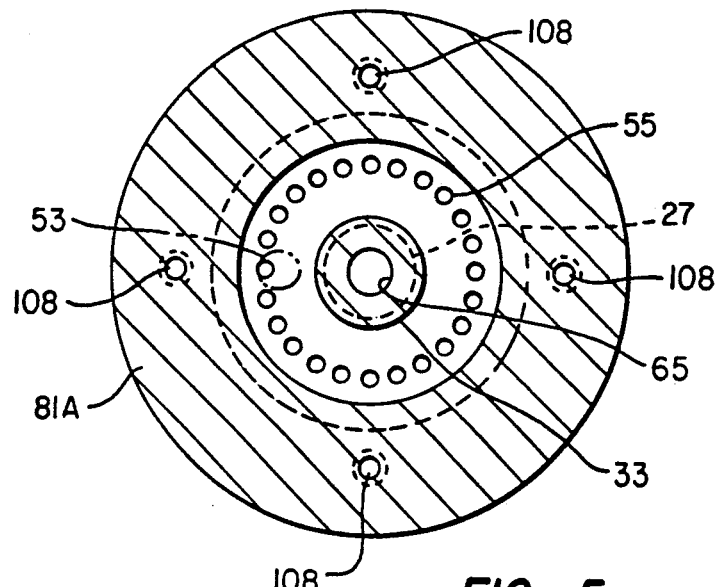
FIG. 5 is a partial cross-sectional view taken along the lines V—V of FIG. 3.

FIG. 4 illustrates the hydraulic circuit for a pulse type injector, although the illustration is schematic. Referring to FIG. 4, when the vacuum pump 37 is turned on, the vacuum cup 16 is evacuated causing a suction force to secure the apparatus to the surface 31, FIGS. 2a and 4. Simultaneously, the area about the fastener 27, including the gap 29, is evacuated to create a less resistant path for flow of the injection medium.

The adjusting means in the form of the adjusting handle 21 and adjusting collar 19 enable positioning the injector over the fastener 27 so that the injector fitting 33 is snug against the structure.

The injector fitting gasket 25 must compress enough to form a good seal but the injector must not be forced against surface 31 with excessive pressure so as to disturb the vacuum cup seal.

When the injector apparatus is turned off or is between pulses, a number one (#1) check valve 35 is opened, allowing the medium from storage tank 34 to fill the feed line 38. A number two check valve 39 is closed during this interval preventing the medium from draining out of the feed line 38. A number three check valve 41, FIGS. 2a and 4 is closed preventing the medium from being drawn out of the feed line 38 by suction.

A pump system 43 operates a hydraulic motor 45 and also supplies hydraulic fluid to a double rod intensifier 47. The hydraulic motor is started by opening a control valve 49, allowing hydraulic fluid to pass through to the motor. The hydraulic motor 45 operates a servo valve 51 which sends a pulse of hydraulic fluid to the intensifier 47 at a predetermined rate; for example, about 10 pulses per second for this application. The hydraulic pump 43 powered by the motor 45 operates at low pressure; for example, in the range of 200–400 pounds per square inch (psi). The intensifier 47 increases the pressure of hydraulic fluid to injection pressure; for example, about 2000 psi for this configuration; and sends the pressure pulse through the feed line 38. The increased pressure in the feed line 38 closes the number one check valve 35, isolating the storage tank 34 from the feed line 38. This also opens a number two and number three check valves, 41, 39, allowing the medium to flow through the feed line 38 to the injection passage 53. Since the injection passage 53 is connected with injection orifices 55, this allows the injection medium to flow out the injection orifices 55, FIGS. 2a, 3 and 5.

Figure 2B:
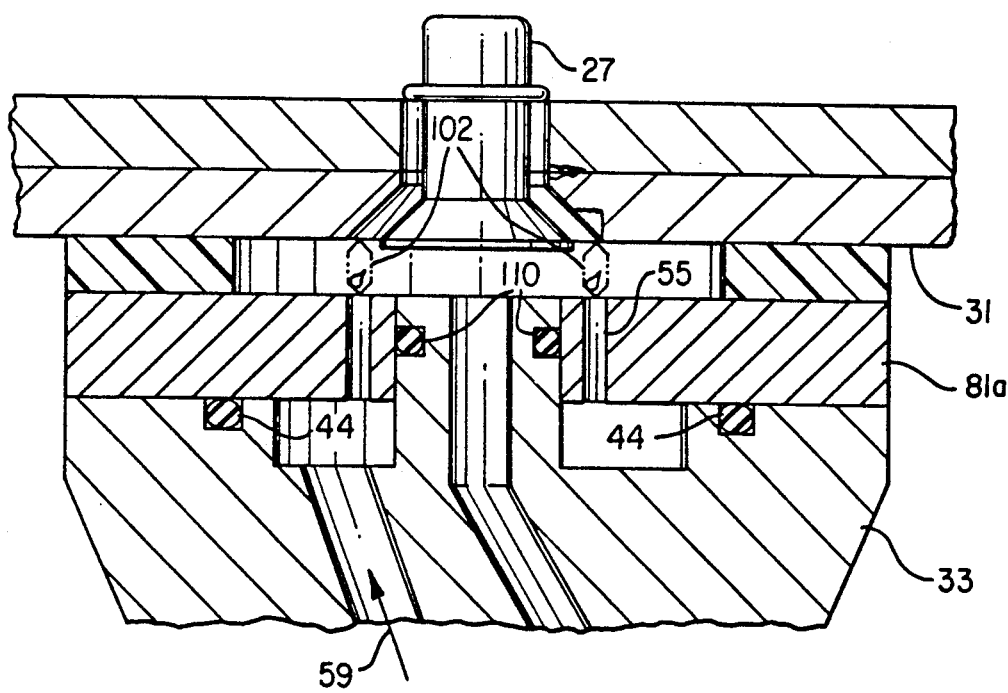
FIG. 2b is an enlarged partial cross-sectional view of the injector fitting of FIG. 2a along the dashed lines III—III.

The injection medium 59, FIG. 3 is forced through injection orifices 55, which circumferentially surrounds the head of fastener and bombards existing gap, void or corrosion pit in the structure: for example, into the gap 29, FIG. 3 intermediate the structure and the fastener 27 or into a void 61, intermediate layers of the structure, or a corrosion pitting 63; by shockwave action created by the pressure pulses traveling through the medium. The reason for the high pulse rates is that when the stream of medium fluid 102, as shown in FIG. 2b contacts the surface of the structure 31, the tail of the stream 102 has already left the injector orifices 55 preventing any reaction from the surface back to the injector through the fluid stream, thereby reducing the back pressure on the vacuum cup 16. The excess fluid 69 exits the drain passage 65, FIGS. 2a, 3 and 4, into a container 67.

Figure 11:
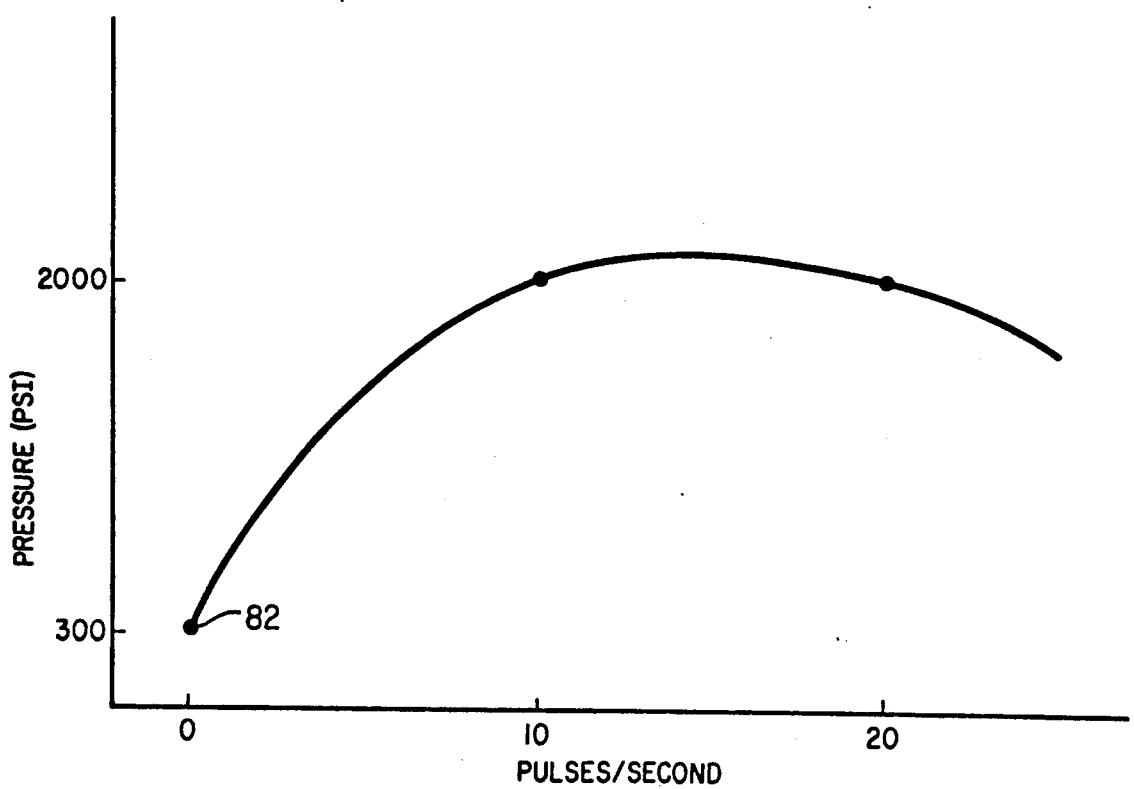
FIG. 11 is a graph showing the relative operating range of the pulse type injection system compared to a static system.

The relative operating range of the pulse type system compared to the static system is shown in FIG. 11. When the pulse rate is zero (data point 82) or near zero, the injection stream is steady state or static as mentioned herein. The maximum injection pressure at this pulse rate is approximately 300 psi for use with the vacuum holddown which corresponds to the operating condition of the static pressure type injector in FIG. 11. This pulsed system can operate up to 2000 psi using only a vacuum holddown while the static pressure system must use a mechanical holddown above 300 psi. The use of the pulse type injector allows a variation of the pulse rate in a corresponding wider range of usable pressures. As the pulse rate is increased the optimal injection pressure is also increased as shown in FIG. 11 until eventually the pulse rate reaches practical limits and the injection medium is just pumped out of the drain line and no further benefit is achieved by using higher pressure.

The best injection results are obtained at an operating condition between 10 and 20 pulses per second at 2000 psi for the pulse type injector system. However lower pulse rates and pressures as low as 600 psi are adequate for many applications. The pulse rates and pressures shown in FIG. 11 apply only to the particular configuration of the injector that was tested and any changes to the system hardware or injection medium viscosity may change the optimal pulse rate/pressure combination.

The drain passage and conduit 69, FIG. 4, serve as a second conduit means for draining off the medium that is not used in the injection. The draining of the medium further reduces the build up of back pressure which would destroy the integrity of the injector fitting seal 25 or even dislodge the injector system from the surface of the structure 31.

After the injection is complete, the control valve 49 is off, deactivating the pulse system. The number two and number three check valves 39 and 41 close and the number one check valve opens, refilling the feed line 38 for another injection. The vacuum release valve 71, FIG. 2a, can be opened, equalizing the pressure between the vacuum cup 16 and the outside air and allowing the injection system to be moved to another location.

The respective elements delineated herein are commercially available and can be purchased to do the job set forth herein Accordingly, no great amount of time will be spent describing elements such as the double rod intensifier, pump, servo valve or the like, since they are readily available. It is sufficient to note that they elevate pressure up to as high as 2000 psi as many repetition rates as desired; for example, 10 per second.

Figure 6:
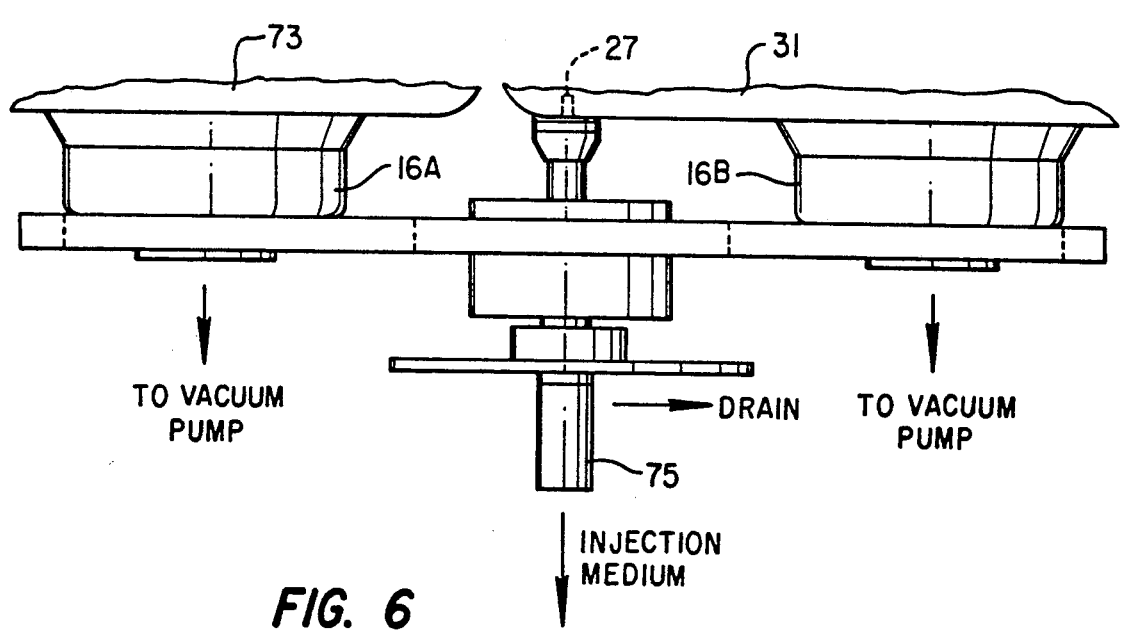
FIG. 6 is a schematic view showing a pulse type injector with a double vacuum cup hold down system, or holding means.

For locations that are not feasible for single vacuum cup holding means, alternate methods of securing the injector to the desired surface have been devised. For example, FIG. 6 illustrates the use of a double vacuum cup hold down system. This system is used for the areas close to the edge or discontinuity in the structure, in this case a corroded fastener 27 close to a gap between a wing surface 31 and a control surface 73. The vacuum cups 16A and 16B are placed equidistant from an injector 75 and one on each surface as shown. The injector 75 is placed directly over the fastener 27 to be injected and the injection is performed as described hereinbefore.

Figure 7:
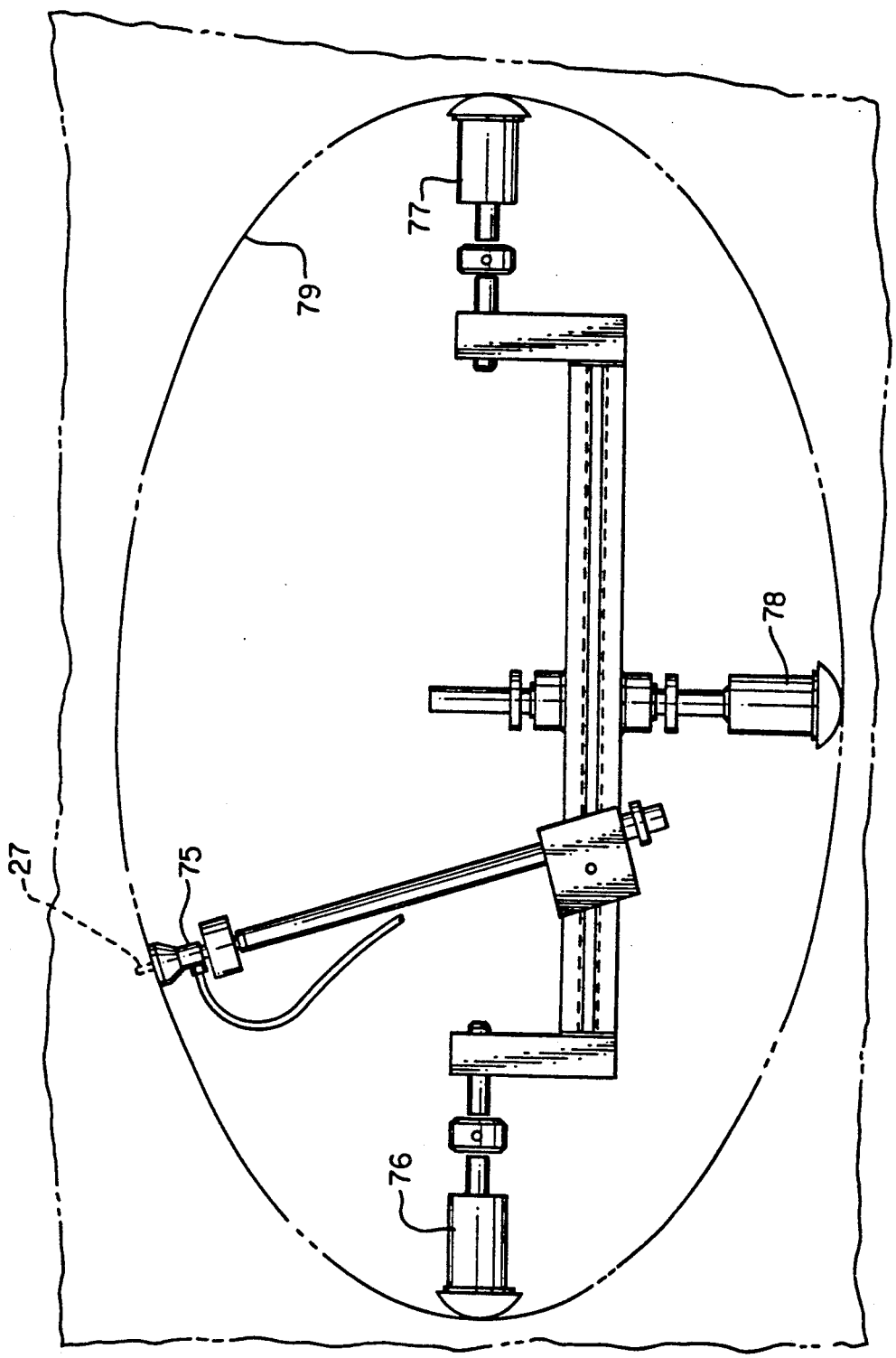
FIG. 7 is an elevational view illustrating a mechanical hold down system, or holding means.
Figure 8:
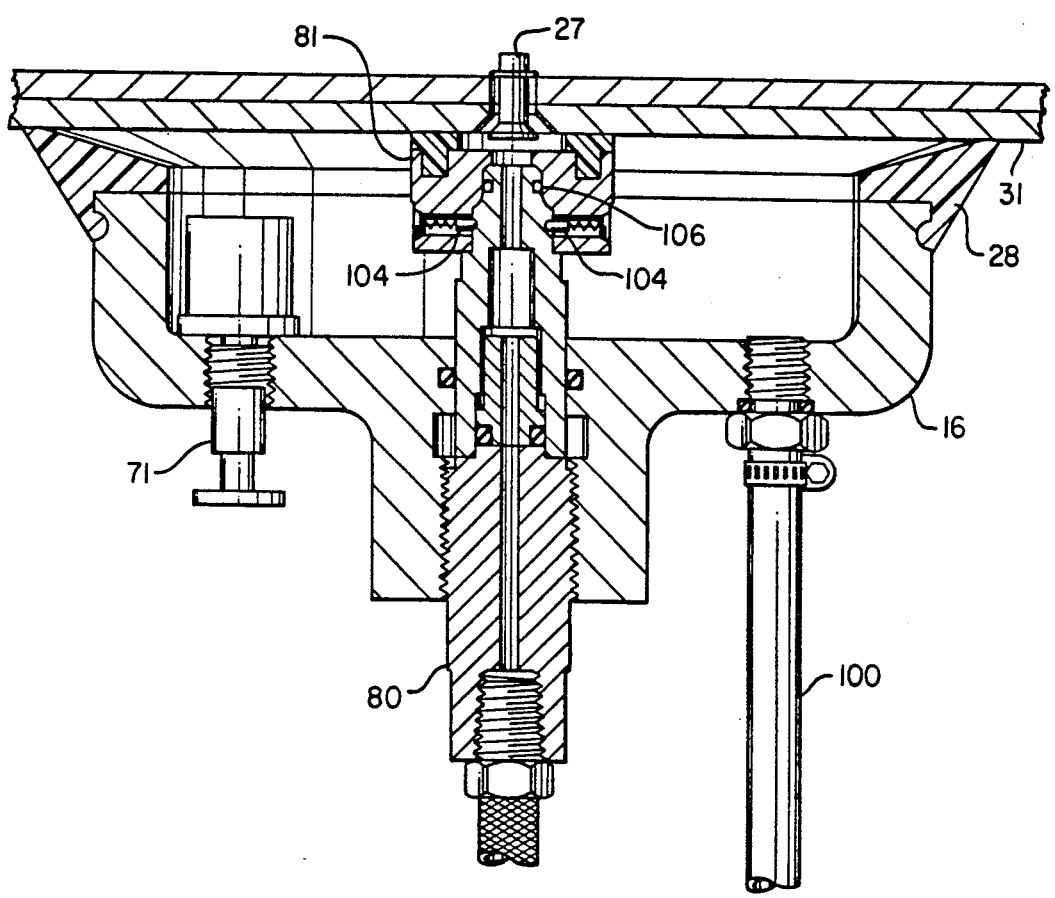
FIG. 8 is a partial cross-sectional view illustrating an injection system employing a quick disconnect injector head and configured for static pressure injection.
Figure 9:
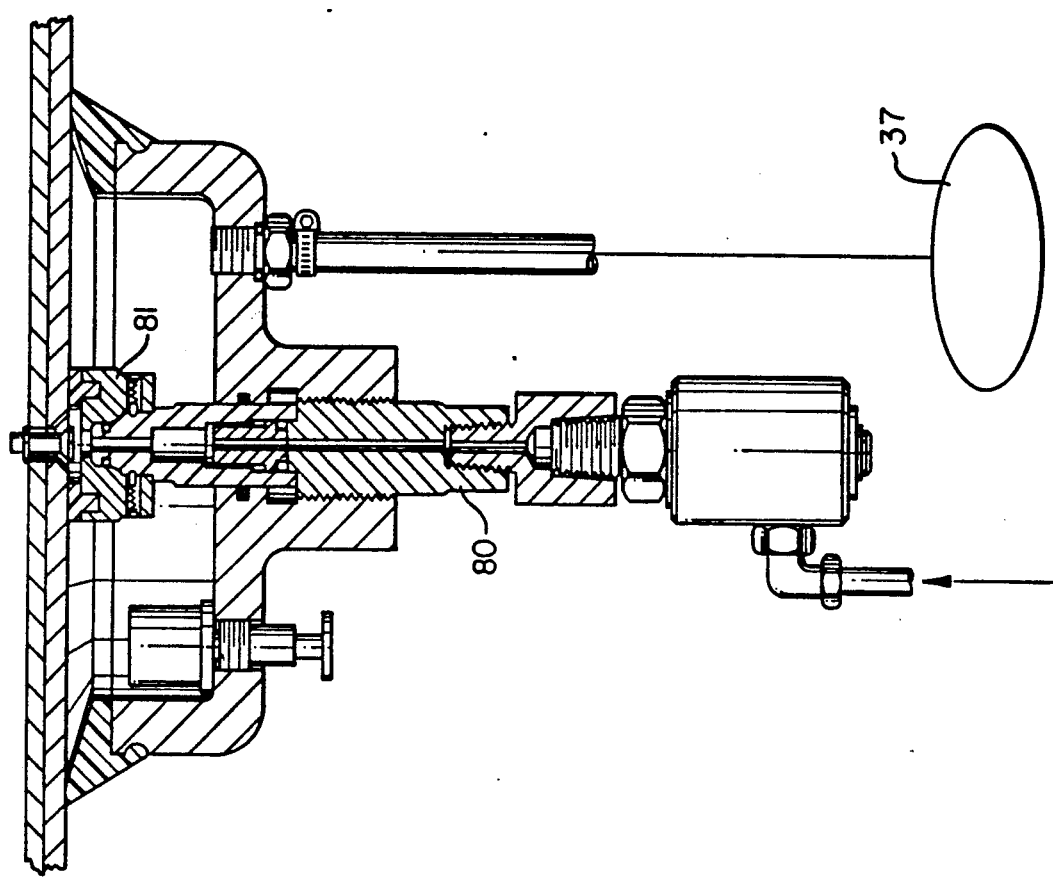
FIG. 9 is a schematic view of a hydraulic circuit for a static pressure injection system.
Figure 9:
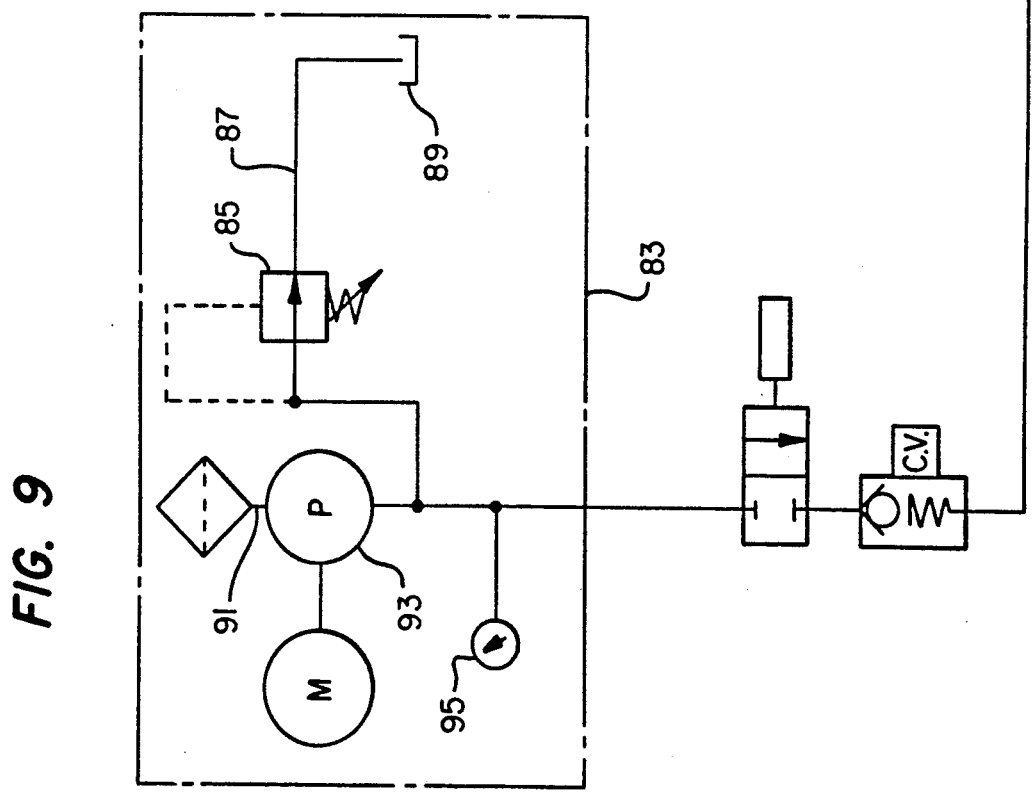
Figure 10:
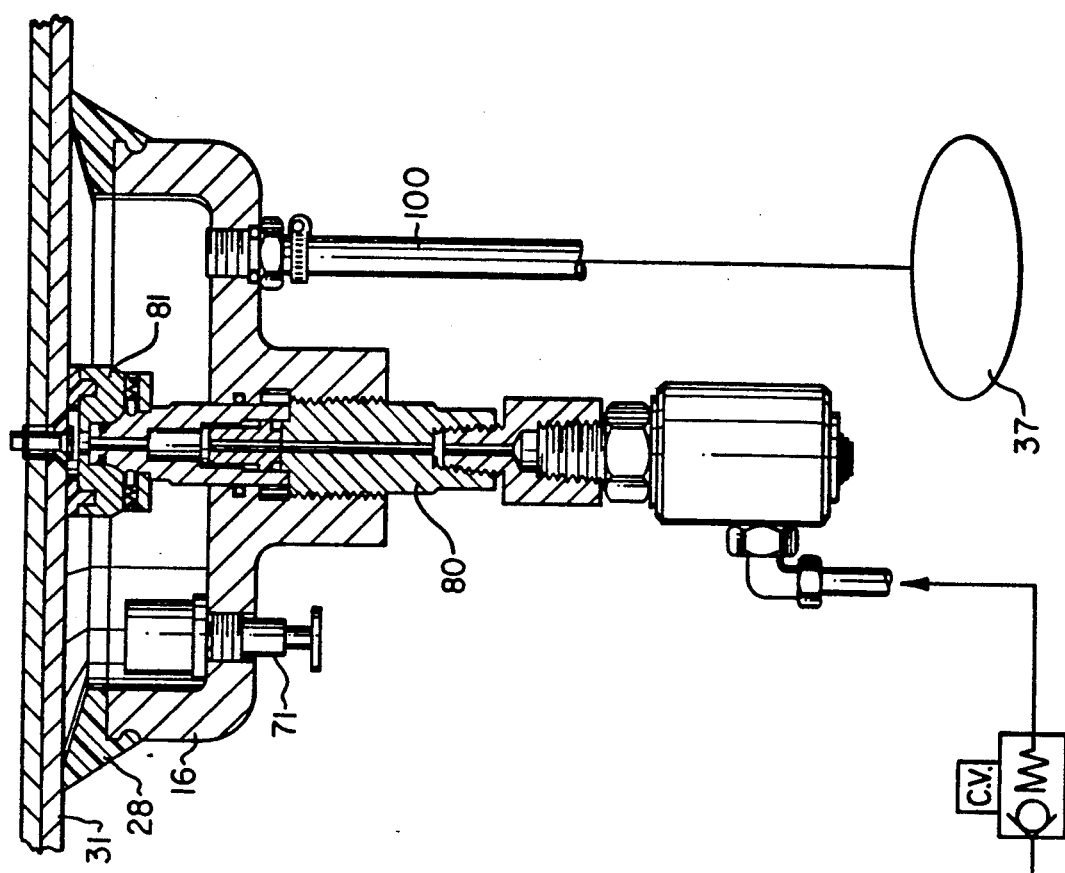
FIG. 10 is a schematic view illustrating an alternate hydraulic circuit for a static pressure injection system.
Figure 10:
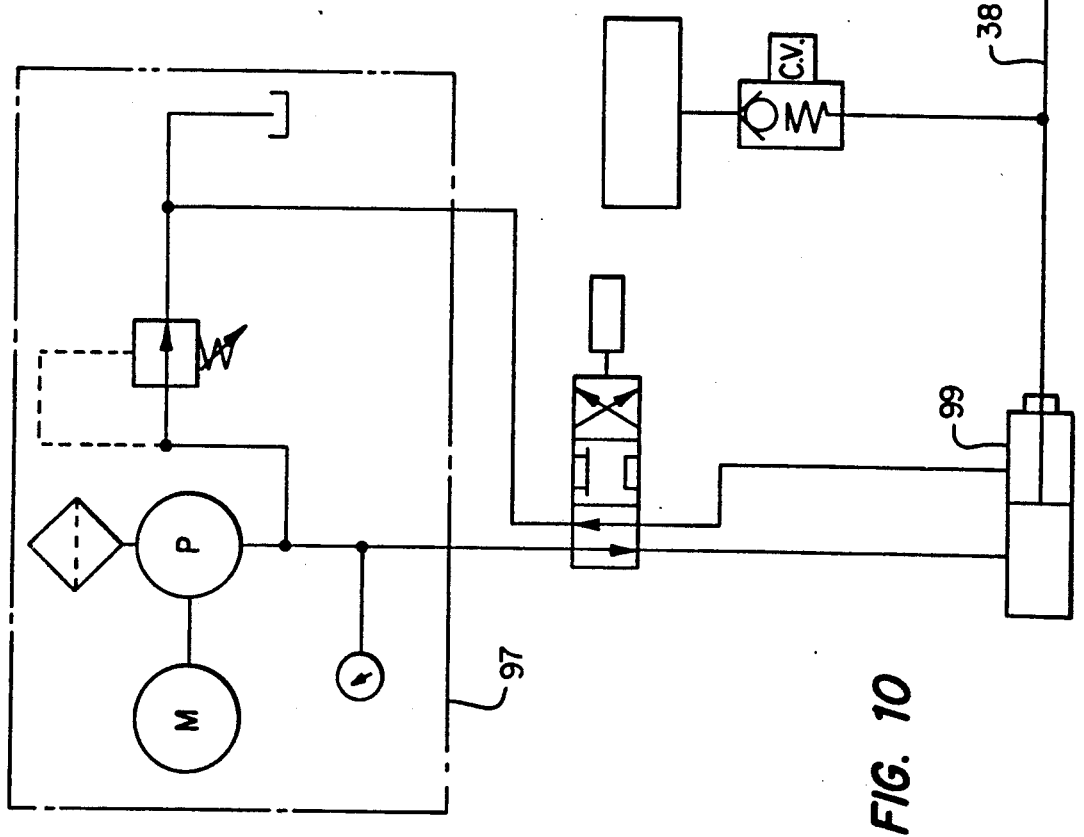

In areas where there is no flat surface for a vacuum cup to seal against; for example, a curved surface of the aircraft inlet duct, a mechanical hold down system such as illustrated in FIG. 7 may be employed. Therein the supports 76, 77 and 78, are positioned to react against the surface of the inlet 79. The adjusting means allows adjusting the injector to obtain the desired performance. The injection is carried out as described hereinbefore.

Where fasteners of different sizes and configurations are to be injected a second system, as illustrated in FIGS. 8, 9, 10 employing a quick disconnect on the injector head 81 has been developed. this quick disconnect allows rapid change out of injector configurations or gasket types to fit multiple fastener requirements.

While the pulsed shock wave injector provides faster, safer, and more reliable injection for most applications both systems allow for static pressure injection in special situations. It is therefore not necessary to resort to prior art to perform static pressure injections. This greatly simplifies static pressure injections and shortens the time required to perform such operations. The quick disconnect type of injector is shown here set up for static operation (FIGS. 8, 9, 10). Referring to FIGS. 8, 9, and 10, the static pressure system consists of an injection tube 80 and an interchangeable injector fitting 81. The injector head or fitting 81 removably couples onto one end of the injection tube 80. Spring biased latch means 104, in the form of balls and detents, are used to secure the fitting 81 onto the tube 80. An O-ring 106 is provided. A pump system 83, FIG. 9, may be employed with the suction side of pump 93 coupled with reservoir, or media tank 89 for drawing in the medium. A pressure relief valve may be employed. The pressure relief valve is shown by the number 85 in FIG. 9. In the illustrated embodiments, the pressure relief valve relieves through line 87 to modium reservoir B9. Tho medium reservoir 89 is also connected to the suction side of pump 93, as by line 91. A gauge 95 is provided as part of the pump system 83.

Alternatively, a pump system 97, FIG. 10, can be employed with an intensifier 99 to obtain suitably high pressure. In the illustrated embodiment, the injection medium is delivered at a constant pressure through the feed line 38, injector 80 and is forced into the fastener hole. The drawback to the system is that when the injection pressure becomes high enough to successfully inject many fasteners, build up of back pressure causes the injector fitting to be forced away from the surface and must be opposed by the mechanical holding means, or hold down system, as priorly described.

The same relative elements are employed in this system as described hereinbefore with respect to FIG. 2a and given the same number; for example, the wing surface is delineated 31, the vacuum release valve is delineated 71 and the vacuum gasket, 28 and the cup, 16. A vacuum line 100 is employed to obtain the vacuum between the vacuum pump 37 and the interior of the vacuum cup 16.

In order to achieve a successful injection, a suitable injection medium must be selected. This medium must be of low enough viscosity to flow freely through the injection system and penetrate the gap about the fastener, or otherwise penetrate into the imperfections. The selection of the medium depends upon the purpose of the injection. For corrosion inhibiting, a water displacing corrosion inhibitor compound, such as those products sold under the trademark Amlguard and satisfying military specification MIL-C-18054(AS); can be employed. For fuel sealing, a chromated sealant, such as those products sold under the trademark Deft and given the NAI number 1328 may be used. Some candidate injection media contain properties suitable for both corrosion inhibiting and fuel sealing and some medium may also require thinning to obtain the desired viscosity.

In operation, the particular medium is put into the storage tank and the suction side of the pump connected thereto. The desired system can be employed in conjunction with the holding means for holding the injector for injection of the medium. Thereafter, the injection medium is turned on for injecting about the particular injection site, such as the gap around the fastener, corrosion pits or other imperfections.

Though developed for inhibiting corrosion, this device may also be used for repairing fuel leaks around installed fasteners. For this application, a suitable fuel sealant is injected instead of a corrosion inhibitor.

As noted hereinbefore, this invention describes a system by which a substance can be forced into existing gaps between fasteners and/or parts of an assembled structure with the purpose of forming a chemical barrier. This barrier can be employed to inhibit corrosion, prevent further corrosion from taking place or repair fuel leaks.

This system may employ either a pulse type or static pressure type injector coupled with specialized hold down systems. The injector conducts under pressure the injection medium to the desired area in such a way that it penetrates gaps or voids that may exist.

The vacuum cup hold down systems are used to secure the pulse type injectors to a relatively flat and smooth surface and the mechanical system is employed to hold the pressure injection apparatus within the curved surfaces that prohibit the use of a vacuum system. The primary advantages of this system are versatility, portability, degree of automation and higher injection pressures Although this invention has been described with a certain degree of particularity, it is understood that the present disclosure is made only by way of example and that combination and arrangement of parts may be resorted to without departing from the spirit and the scope of the invention, reference being had for the latter purpose to the appended claims.

What is claimed is:

1. A method of injecting a barrier about a fitting at an injection site comprising the steps of:
    a. applying a pressure on an injection medium and conveying the pressurized injection medium to the injection site via a first conduit means extending from a pressure inducing means connected with storage means to the injection site;
    b. conveying any unused medium away from the injection site via a second conduit means at the same time that the pressurized injection medium is conveyed to the injection site via the first conduit means and adjusting an injection apparatus so as to be held with a gasket sealingly surrounding the injection site for constraining the medium to flow under said pressure into the site and about the fitting.

2. The method of claim 1 wherein an adjustable vacuum holding means is employed and a vacuum release means is employed to release said vacuum.

3. A method of injecting a barrier about a fitting at an injection site comprising the steps of:
    a. applying a pressure on an injection medium and conveying the pressurized injection medium to the injection site via a first conduit means extending from a pressure inducing means connected with storage means to the injection site;
    b. conveying any unused medium away from the injection site via second conduit means and adjusting an injection apparatus so as to be held with a gasket sealingly surrounding the injection site for constraining the medium to flow under said pressure into the site and about the fitting;
    c. employing an adjustable vacuum holding means for holding said injection apparatus at said injection site and a vacuum release means for releasing said vacuum holding means;
    d. said pressure being a pulsating pressure varied between 10 and 20 pulses per second.

4. The injection method of claim 3 wherein the pressure is maintained at about 2000 psi.

5. The method of claim 2 wherein said pressure is a steady pressure and does not exceed about 300 psi.

6. The method of claim 1 further comprising the steps of introducing said injection medium to said injection site in an annular arrangement and conveying said unused medium away from the injection site through an interior space in said annular arrangement.

7. A method for injecting a fluid medium into a location at a work site, comprising the steps of:
    a) coupling vacuum means to said work site such that said work site is located within a volume that can be evacuated by said vacuum means;
    b) evacuating air from said volume and said work site with said vacuum means;
    c) with said work site evacuated of air, engaging an injector means to said work site such that a seal is located around said location;
    d) injecting said fluid medium into said location, said fluid medium being injected under pressure and through a first conduit in said injector means;

e) conveying any unused fluid medium away from said location through a second conduit in said injector means at the same time that said pressurized fluid medium is being injected into said location through said first conduit, wherein the conveying away of said unused fluid medium reduces the buildup of pressure at said location, which pressure could open said seal.

8. The method of claim 7 further comprising the step of retaining said injector means to said work site with said vacuum means, said vacuum means retaining said injector means so as to maintain said seal.

9. The method of claim 8 further comprising the steps of introducing said injection medium to said injection site in an annular arrangement and conveying said unused medium away from the injection site through an interior space in said annular arrangement.

10. The method of claim 8 wherein said fluid medium is injected to said location under a pulsating pressure so as to minimize the injection force acting on said vacuum means.

11. The method of claim 7 further comprising the steps of introducing said injection medium to said injection site in an annular arrangement and conveying said unused medium away from the injection site through an interior space in said annular arrangement.

12. The method of claim 1 wherein said pressure is a pulsating pressure having a pulse rate between 10 to 20 pulses per second.

13. The method of claim 12 wherein said medium is pressurized up to 2000 psi.

14. The method of claim 1 wherein said pressure is a pulsating pressure having a pulse rate between 10 to 20 pulses per second.

15. The method of claim 14 wherein said medium is pressurized up to 2000 psi.

16. The method of claim 7 wherein said medium is pressurized in pulses having a pulse rate of between 10 to 20 pulses per second, said medium being pressurized up to 2000 psi.

17. The method of claim 7 wherein the step of engaging said injector means comprises engaging said seal to said work site without rotating said seal relative to said work site, such that the integrity of said seal around said work site is maintained.

18. A method for injecting a fluid medium into a location at a work site, comprising the steps of:
a) engaging an injector means to said work site such that a seal is located around said location;
b) injecting said fluid medium into said location, said fluid medium being injected under pressure through a first conduit in said injector means;
c) while injecting said fluid medium into said location through said first conduit, conveying any unused fluid medium away from said location through a second conduit located in said injector means, wherein the conveying away of said unused fluid medium reduces the buildup of pressure at said location.

19. The method of claim 18 further comprising the step of retaining said injector means to said work site with vacuum means, said vacuum means retaining said injector means so as to maintain said seal.

20. The method of claim 19 further comprising the steps of introducing said injection medium to said injection site in an annular arrangement and conveying said unused medium away from the injection site through a center of said annular arrangement.

21. The method of claim 19 wherein said fluid medium is injected to said location under a pulsating pressure so as to minimize the injection force acting on said vacuum means.

22. The method of claim 18 further comprising the steps of introducing said injection medium to said injection site in an annular arrangement and conveying said unused medium away from the injection site through a center of said annular arrangement.

23. A method for injecting a fluid medium into a location at a work site, comprising the steps of:
a) providing injector means for injecting said medium, said injector means having respective first and second conduit means located therein, said first and second conduit means having respective openings;
b) engaging said injector means to a surface about said work site such that said first conduit means opening is spaced from said work site surface by a distance;
c) providing a seal around said location and said first and second conduit means openings, said seal being located between said injector means and said work site;
d) injecting said medium into said location, said medium being injected under pulsating pressure through said first conduit means so as to create beads of said medium, said pulsating pressure having a pulse rate that is sufficiently high such that as said respective beads of medium traverse said distance between said first conduit means opening and said work site surface, said beads have exited said first conduit means when said beads contact the work site surface so as to minimize back pressure on said seal;
e) conveying any unused medium away from said location through said second conduit means.

24. The method of claim 23 wherein said medium is pressurized in pulses having a pulse rate of between 10 to 20 pulses per second, said medium being pressurized up to 2000 psi.

25. The method of claim 23 further comprising the step of retaining said injector means to said work site with vacuum means, said vacuum means retaining said injector means so as to maintain said seal.

26. The method of claim 23 further comprising the steps of introducing said injection medium to said injection site in an annular arrangement and conveying said unused medium away from the injection site through a center of said annular arrangement.

27. The method of claim 23 further comprising the steps of:
a) said medium is pressurized in pulses having a pulse rate of between 10 to 20 pulses per second, said medium being pressurized up to 2000 psi;
b) retaining said injector means to said work site with vacuum means, said vacuum means retaining said injector means so as to maintain said seal;
c) introducing said injection medium to said injection site in an annular arrangement and conveying said unused medium away from the injection site through a center of said annular arrangement.

28. A method for injecting a fluid medium into a location at a work site, comprising the steps of:
a) engaging an injector means to said work site such that a seal is located around said location;
b) injecting said fluid medium into said location, said fluid medium being injected under pressure through a first conduit in said injector means, said fluid medium being injected in an annular arrangement;

c) conveying any unused fluid medium away from said location through a second conduit located in said injector means, said unused medium being conveyed away from said location through the center of said annular arrangement.

* * * * *